(12) United States Patent
Tanisaka

(10) Patent No.: US 7,830,551 B2
(45) Date of Patent: Nov. 9, 2010

(54) IMAGE PROCESSING METHOD, IMAGE PROCESSING DEVICE, AND COMPUTER PROGRAM

(75) Inventor: Yoshiaki Tanisaka, Kyoto (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 638 days.

(21) Appl. No.: 11/797,682

(22) Filed: May 7, 2007

(65) Prior Publication Data

US 2008/0278761 A1 Nov. 13, 2008

(30) Foreign Application Priority Data

May 11, 2006 (JP) ............................... 2006-132681

(51) Int. Cl.
*H04N 1/40* (2006.01)
(52) U.S. Cl. ....................................... 358/2.1; 358/468
(58) Field of Classification Search ................ 358/3.04, 358/1.15, 1.9, 2.1, 1.17–1.18, 3.28, 468
See application file for complete search history.

(56) References Cited

U.S. PATENT DOCUMENTS

| 6,313,921 | B1 * | 11/2001 | Kadowaki | .................. | 358/1.15 |
| 7,054,029 | B1 * | 5/2006 | Ohta et al. | ................. | 358/1.18 |
| 2001/0019632 | A1 * | 9/2001 | Shibaki et al. | .............. | 382/252 |
| 2003/0090728 | A1 * | 5/2003 | Schramm et al. | ........... | 358/3.04 |

FOREIGN PATENT DOCUMENTS

| JP | 6-261211 A | 9/1994 |
| JP | 9-167247 A | 6/1997 |
| JP | 2000-125134 A | 4/2000 |
| JP | 2001-143050 A | 5/2001 |
| JP | 2005-212440 A | 8/2005 |

OTHER PUBLICATIONS

"Introduction to Adobe Photoshop| The Eye Dropper Tool", Oct. 11, 1999, <http://web.archive.org/web/19991011203315/extropia.com/tutorials/photoshop/eye_dropper_tool.html>.*
Japanese Office Action dated Jun. 8, 2010, issued in corresponding Japanese Patent Application No. 2006-132681.

* cited by examiner

*Primary Examiner*—Thomas D Lee
*Assistant Examiner*—Stephen M Brinich
(74) *Attorney, Agent, or Firm*—Westerman, Hattori, Daniels & Adrian, LLP

(57) ABSTRACT

Image data is acquired, it is determined whether the tone value specified by tone value information included in the acquired image data is equal to or greater than a predetermined tone value, and the tone value information is converted into a description that indicates a still smaller tone value if it is determined that the answer is negative.

14 Claims, 7 Drawing Sheets

FIG. 4
(a)
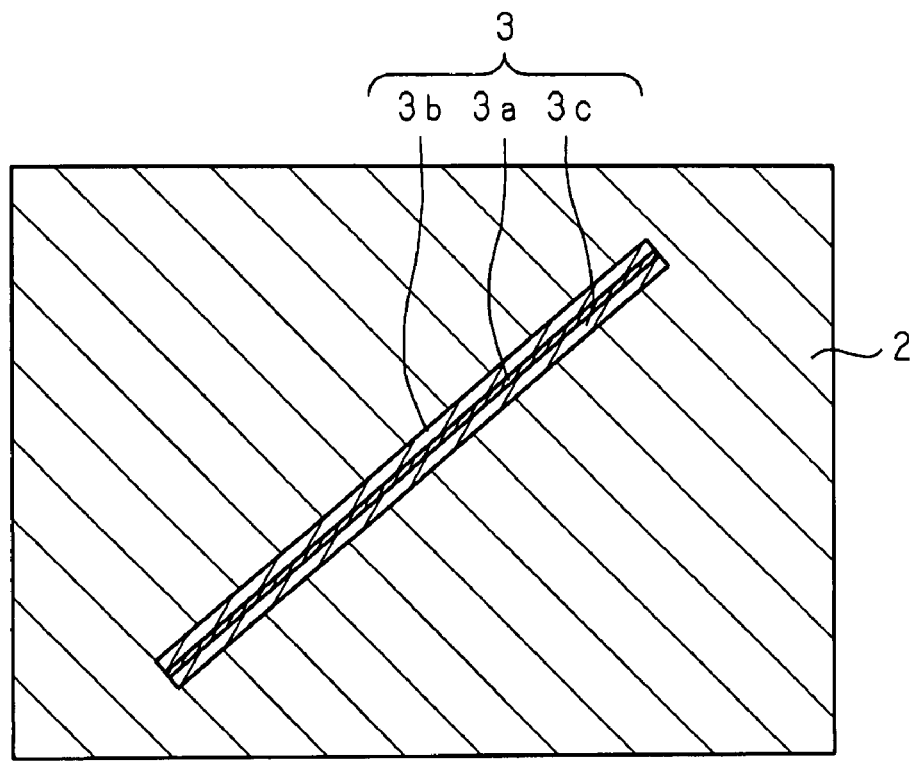
(b)
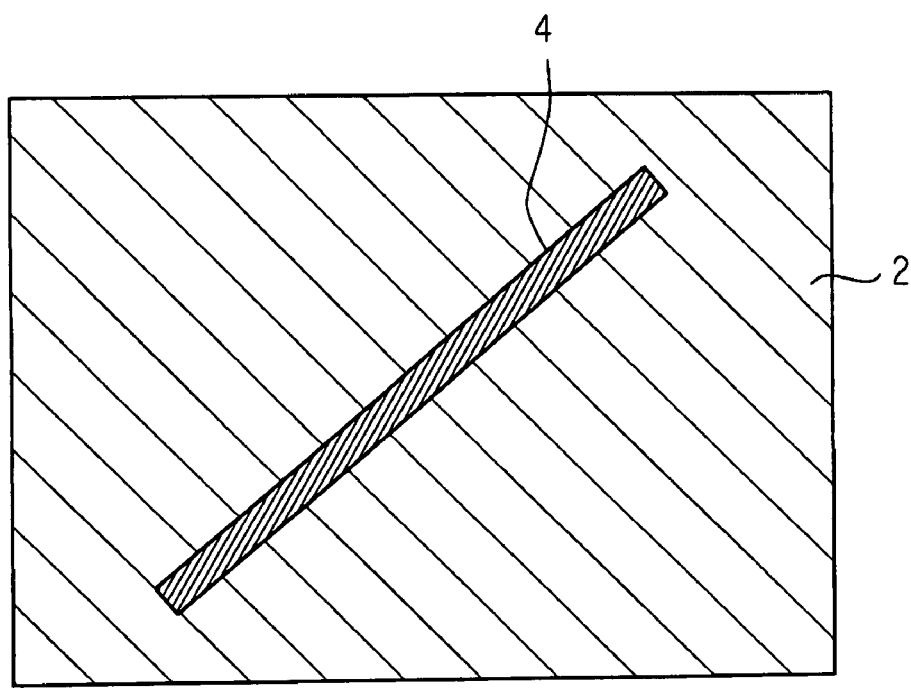

IMAGE PROCESSING METHOD, IMAGE PROCESSING DEVICE, AND COMPUTER PROGRAM

BACKGROUND OF THE INVENTION

1. Field of the Invention

The present invention relates to an image processing method which corrects image data described in Page Description Language (PDL), an image processing device which performs the image processing method, a computer program which allows a computer to perform the image processing method, and a recording medium on which the computer program is recorded.

2. Description of the Related Art

DTP (Desk Top Publishing) software describes image data in page description language. The image data described in page description language includes bitmap data of an image such as photos, drawing instruction to draw a line drawing over an image, and tone value information that specifies the tone value of the line drawing drawn by the drawing instruction, etc.

Then, the DTP software gives image data to a drawing routine such as GDI (Graphics Device Interface), and Quick-Draw of an OS (Operating System), generates image data, and displays an image on a display device. In addition, if the image is to be printed, the image data described in page description language is transmitted to a printer.

The printer having the function that interprets the page description language generates image data based on the bitmap data and the drawing instruction included in the image data, and prints the image on paper based on the generated image data.

SUMMARY OF THE INVENTION

However, when an image drawn with gray fine lines in an image of bitmap data is printed on a grayscale, there is a problem that it is sometimes difficult to see the fine line. For example, when a fine black line is drawn over an image of bitmap data, there is DTP software which changes both edges of the fine line to gray in the generated image data. When such image data generated by the DTP software is printed on a grayscale, it is sometimes difficult to see the fine line. Similarly, depending on the colors of an image of bitmap data, it is sometimes difficult to see a fine white line.

The invention has been made in view of the circumstances, in which it is determined whether the tone value specified by tone value information is equal to or greater (or equal to or smaller) than a predetermined tone value, and when it is determined that the answer is negative, the tone value information is converted to tone value information that specifies a tone value which is still smaller (or greater). An object of the invention is to in this way provide an image processing method which can obtain image data that corrects a line drawing drawn over an image so that the image of bitmap data is not degraded and the line is more visible, an image processing device which performs this image processing method, and a computer program which allows a computer to perform the image processing method.

Another object of the invention is to provide an image processing device including an accepting means accepting a image data correction method. When the accepting means accepts a first correction method, it is determined whether the tone value specified by tone value information is equal to or greater than a first predetermined tone value. If the answer is determined to be negative, the tone value information is converted into a tone value information that specifies a still smaller tone value. When the accepting means accepts a second correction method, it is determined whether the tone value specified by tone value information is equal to or smaller than a second predetermined tone value. When it is determined that the answer is negative, the tone value information is converted into a tone value information that specifies a still larger tone value. Accordingly, a correction method can be selected depending on the colors of an image, and corrected image data of a line drawing drawn over an image which does not degrade the image of bitmap data and is easily visible can be obtained.

An image processing method according to the invention is an image processing method which corrects image data including bitmap data of an image, a drawing instruction to draw a line drawing over an image, and tone value information that specifies a tone value of the line drawing drawn by the drawing instruction, the method including the steps of: determining whether the tone value specified by tone value information is equal to or greater (or equal to or smaller) than a predetermined tone value; and converting the tone value information into tone value information that specifies a still smaller (or greater) tone value when it is determined that the answer is negative.

An image processing device according to the invention is an image processing device which corrects image data including bitmap data of an image, a drawing instruction to draw a line drawing over an image, and tone value information that specifies a tone value of the line drawing drawn by the drawing instruction, the device including a determining means which determines whether the tone value specified by tone value information is equal to or greater (or equal to or smaller) than a predetermined tone value; and a converting means which converts the tone value information into a tone value information that specifies a still smaller (or larger) tone value when the answer by the determining means is negative.

An image processing device according to the invention is an image processing device which corrects image data including bitmap data of an image, a drawing instruction to draw a line drawing over the image, and tone value information that specifies a tone value of the line drawing drawn by the drawing instruction, the device including an accepting means which accepts a correction method of image data; a first determining means which determines whether the tone value specified by tone value information is equal to or greater than a first predetermined tone value when the accepting means accepts a first correction method; a first converting means which converts the tone value information into a tone value information that indicates a still smaller tone value when the answer by the first determining means is negative; a second determining means which determines whether the tone value specified by tone value information is equal to or smaller than a second predetermined tone value when the accepting means accepts a second correction method; and a second converting means which converts the tone value information into a tone value information that specifies a still greater tone value when the answer by the second determining means determines is negative.

A computer program according to the invention is a computer program which allows a computer to correct image data including bitmap data of an image, a drawing instruction to draw a line drawing over an image, and tone value information that specifies the tone value of the line drawing drawn by the drawing instruction, and which allows the computer to perform the steps of: determining whether the tone value specified by tone value information is equal to or greater (or equal to or smaller) than a predetermined tone value; and converting the tone value information into tone value information that specifies a still smaller (or greater) tone value when it is determined that the answer is negative.

A recording medium according to the invention is a computer readable recording medium on which a computer program is recorded, the computer program allowing a computer to correct image data including bitmap data of an image, a drawing instruction to draw a line drawing over an image, and tone value information that specifies the tone value of the line drawing drawn by the drawing instruction, and allowing the computer to perform the steps of: determining whether the tone value specified by tone value information is equal to or greater (or equal to or smaller) than a predetermined tone value; and converting the tone value information into tone value information that specifies a still smaller (or greater) tone value when it is determined that the answer is negative.

In the invention, it is determined whether the tone value specified by tone value information is equal to or greater than a predetermined tone value. When it is determined that it is below a predetermined tone value, the tone value information is converted into tone value information that specifies a still smaller tone value. For example, it is determined whether the tone value is 255 or greater, and tone value information is converted into a tone value information that indicates a tone value of 0 when it is determined that the answer is negative. More specifically, a gray line drawing is converted into a black line drawing. Therefore, an image after correction has a line drawing portion more visible than that of an image before correction. Similarly, it is determined whether the tone value specified by tone value information is equal to or smaller than a predetermined tone value, and the tone value information is converted into a tone value information that specifies a still greater tone value when it is determined that it is greater than a predetermined tone value. For example, it is determined whether the tone value is 0 or smaller, tone information is converted into a tone value information that specifies a tone value of 255 when it is determined that the answer is negative. More specifically, a gray line drawing is converted into a white line drawing. Accordingly, the line drawing portion after correction is more visible than the line drawing before correction depending on colors of a bitmap data image.

In the invention, the accepting means accepts a correction method of image data. When it accepts a first correction method, as described above, it is determined whether the tone value specified by tone value information is equal to or greater than a first predetermined tone value. When it is determined that it is below the first predetermined tone value, tone value information is converted into a tone value information that specifies a still smaller tone value. When the accepting means accepts a second correction method, it is determined whether the tone value specified by tone value information is equal to or smaller than a second predetermined tone value. When it is determined that it is greater than the second predetermined tone value, tone value information is converted into a tone value information that specifies a still greater tone value. Accordingly, the tone value of a line drawing can be converted in accordance with two types of methods depending on the accepted correction method, and the line drawing portion after correction is more visible than that of an image before correction.

According to the invention, image data can be obtained that corrects a line drawing drawn over an image for better visibility, without degrading an image of bitmap data.

According to the invention, a correction method can be selected depending on the colors of the image, and image data can be obtained that corrects a line drawing drawn over an image for better visibility, without degrading an image of bitmap data.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 4A and 4B show schematic diagrams depicting images before and after image correction, respectively.

DETAILED DESCRIPTION OF THE PREFERRED EMBODIMENTS

Hereinafter, the invention will be described in detail with reference to the drawings illustrating the preferred embodiments.

First Embodiment

Figure 1:
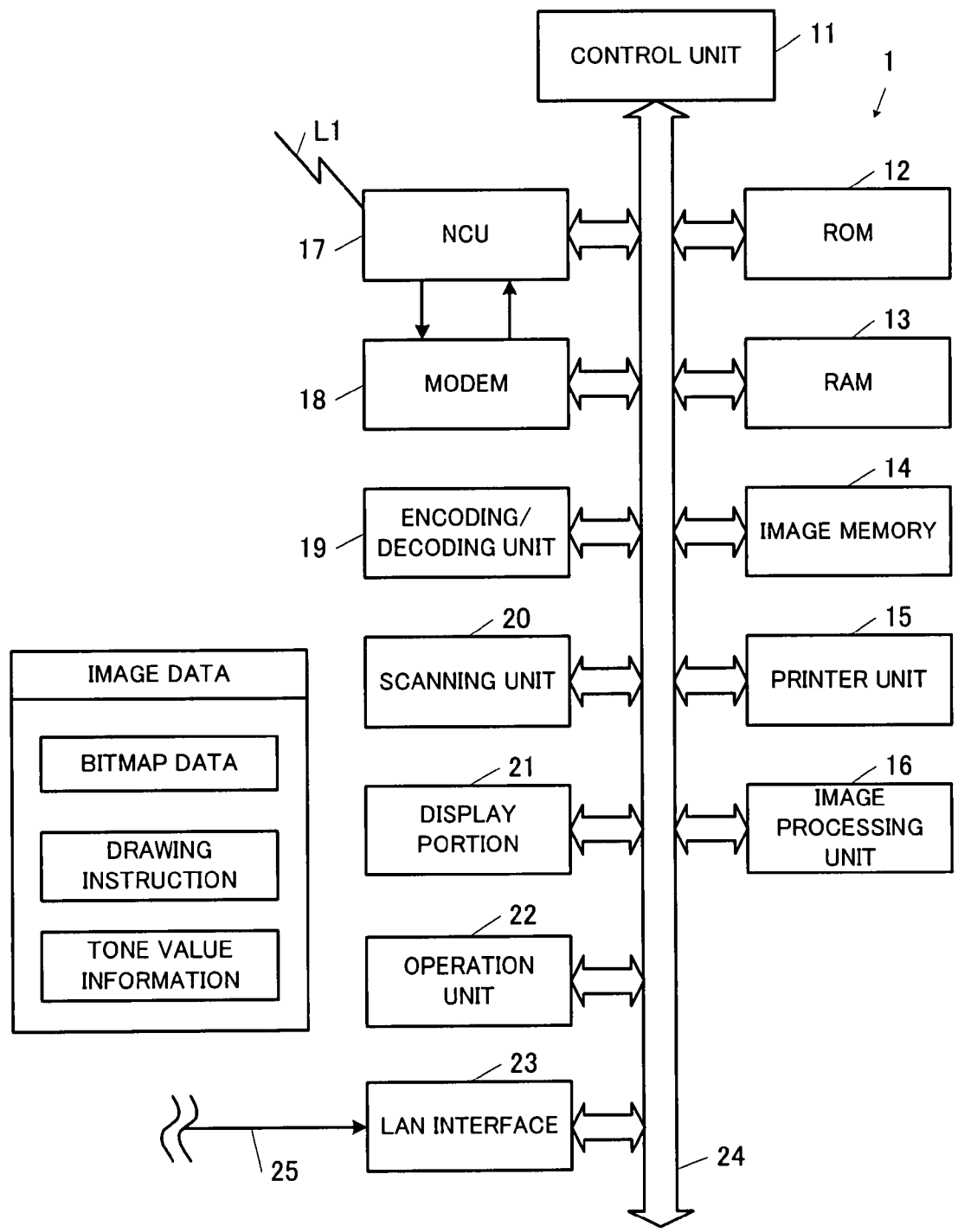
FIG. 1 illustrates a block diagram depicting the configuration of a multifunction device which performs an image processing method according to a first embodiment of the present invention.

FIG. 1 illustrates a block diagram depicting the configuration of a multifunction device 1 which performs an image processing method according to the first embodiment of the present invention. The multifunction device 1 according to the first embodiment has an image correction function, a network printer function, a facsimile function, etc. The image correction function, described in the page description language, corrects image data including bitmap data and drawing instruction, and particularly has a function which corrects a fine line drawn over an image of bitmap data for better visibility.

The multifunction device 1 has a LAN interface 23; an image memory 14 which temporarily stores image data acquired from an external computer, not illustrated, through the LAN interface 23; an image processing unit 16 which corrects image data stored in the image memory 14 and generates image data for printing based on the corrected image data; a printer unit 15 which creates an image on paper, that is, which prints an image based on the image data stored in the image memory 14; and a control unit 11. The control unit 11 is configured to control the acquisition of image data through a bus 24, the correction, and the generation and printing of image data, whereby it implements the network printer function.

The LAN interface 23 connected to the bus 24 is connected to an external computer, not illustrated, through the LAN 25, and the control unit 11 is configured to acquire image data transmitted from the computer through the LAN interface 23.

The image processing unit 16 applies a predetermined correction to image data described in the page description language, that is, image data including bitmap data, drawing instructions for drawing lines, brush strokes, and filling, tone value information that specifies the tone value of the line drawing, and information that specifies the thickness of the line drawing, and the unit generates image data for printing based on the corrected image data. In addition, tone value information is information that specifies colors of a so-called logic pen to draw a line drawing.

The printer unit 15 is a printer apparatus employing an electrophotographic method having a photoconductive drum, a fuser and so on, which has a flash ROM, not illustrated, having a program for printing processing stored therein, and which prints an image of image data on paper in accordance with the program stored in the flash ROM.

To the bus 24, a ROM 12 and a RAM 13 are connected. The ROM 12 comprises a flash memory, which stores various control programs necessary for the operation of the multifunction device 1. The control unit 11 reads out the control program stored in the ROM 12 on the RAM 13 and executes it by implementing various functions such as the image correction function, the network printer function, the copy function, and the facsimile function of the multifunction device 1.

In addition, the multifunction device 1 has a scanning unit 20 which reads a document to acquire image data of the document. The control unit 11 is configured to control image data acquisition and printing by the printer unit 15 through the bus 24 to implement the copy function.

The scanning unit 20 has a light source which shines light onto a document, and an optical element such as a line CCD which converts the reflected light reflected from the document into an electric signal, and the scanning unit 20 acquires the image data of the document based on the electric signal converted by the line CCD. Then, the scanning unit 20 stores the acquired image data in the image memory 14, and the printer unit 15 prints an image based on the image data stored in the image memory 14.

In addition, the multifunction device 1 has an NCU (Network Control Unit) 17 and a modem 18 which transmit and receive image data in facsimile communications, and an encoding/decoding unit 19 which encodes and decodes the image data to be transmitted and received in accordance with a predetermined coding method, such as Modified Huffman coding, modified READ coding, and Modified Modified Read coding. The control unit 11 controls image data transmission and reception, document read, and image printing to implement the facsimile function.

The modem 18 is connected to the bus 24, having the function that demodulates analog image data inputted from a public switched telephone network (PSTN) into digital image data and modulates the image data given from the image memory 14 through the bus 24 by means of control done by the control unit 11 into an analog signal.

The NCU 17 is hardware which performs the operation of connecting and breaking a line L1 to a public switched telephone network, and NCU 17 also connects the modem 18 to the public switched telephone network in accordance with control done by the control unit 11.

The encoding/decoding unit 19 encodes the image data read by the scanning unit 20, and gives the encoded image data to the modem 18 in accordance with control done by the control unit 11. In addition, the encoding/decoding unit 19 decodes the image data received via facsimile communications, and stores it in the image memory 14.

In addition, the bus 24 is connected to an operation unit 22 and a display portion 21 for operating the multifunction device 1. The display portion 21 has a liquid crystal display which displays the operating state of the multifunction device 1 and software keys to operate the multifunction device 1.

The operation unit 22 has a resistive film or electrostatic capacitive touch panel which is placed against the display portion 21, and is configured to allow the control unit 11 to detect the operation of the software key displayed on the display portion 21. In addition, the operation unit 22 has push button keys such as a start key, a numeric keypad, and a reset key.

Figure 2:
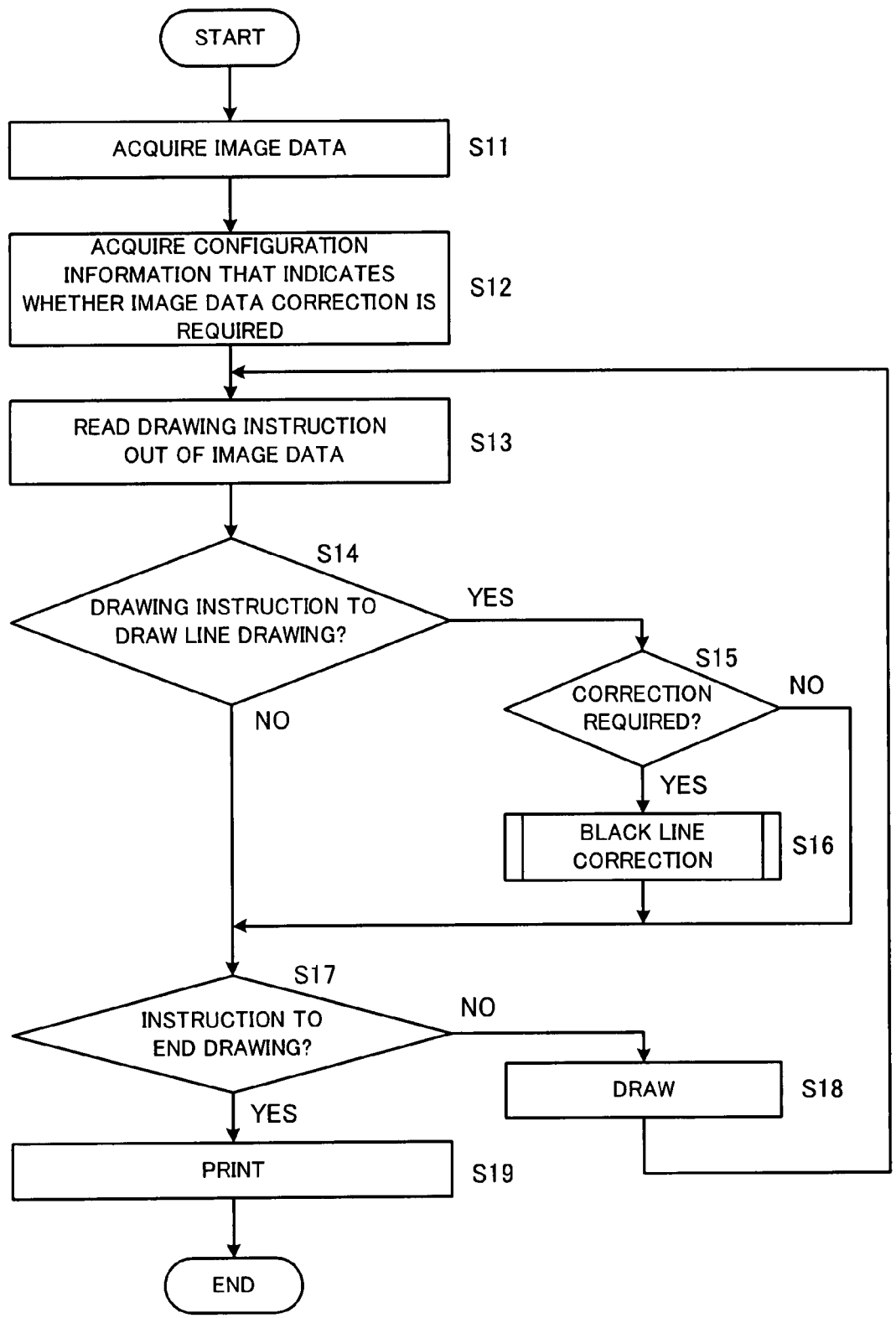
FIG. 2 illustrates a flow chart depicting the process sequence of a control unit for image correction and printing.

FIG. 2 illustrates a flow chart depicting the process procedures of the control unit 11 for image correction and printing. The control unit 11 acquires image data through the LAN interface 23 (Step S11), and acquires configuration information that indicates whether image data correction is required or not (Step S12). The answer is inputted to the external computer, and it is transmitted from the computer.

Subsequently, the control unit 11 reads one drawing instruction out of image data (Step S13), and determines whether the read drawing instruction is a drawing instruction to draw a line drawing (Step S14). When it is determined that it is a drawing instruction to draw a line drawing (Step S14: YES), the control unit 11 determines whether image data correction is required based on the configuration data acquired at Step S12 (Step S15). When it is determined that correction is required (Step S15: YES), the control unit 11 calls a sub-routine for black line correction of image data and corrects the image data (Step S16).

Figure 3:
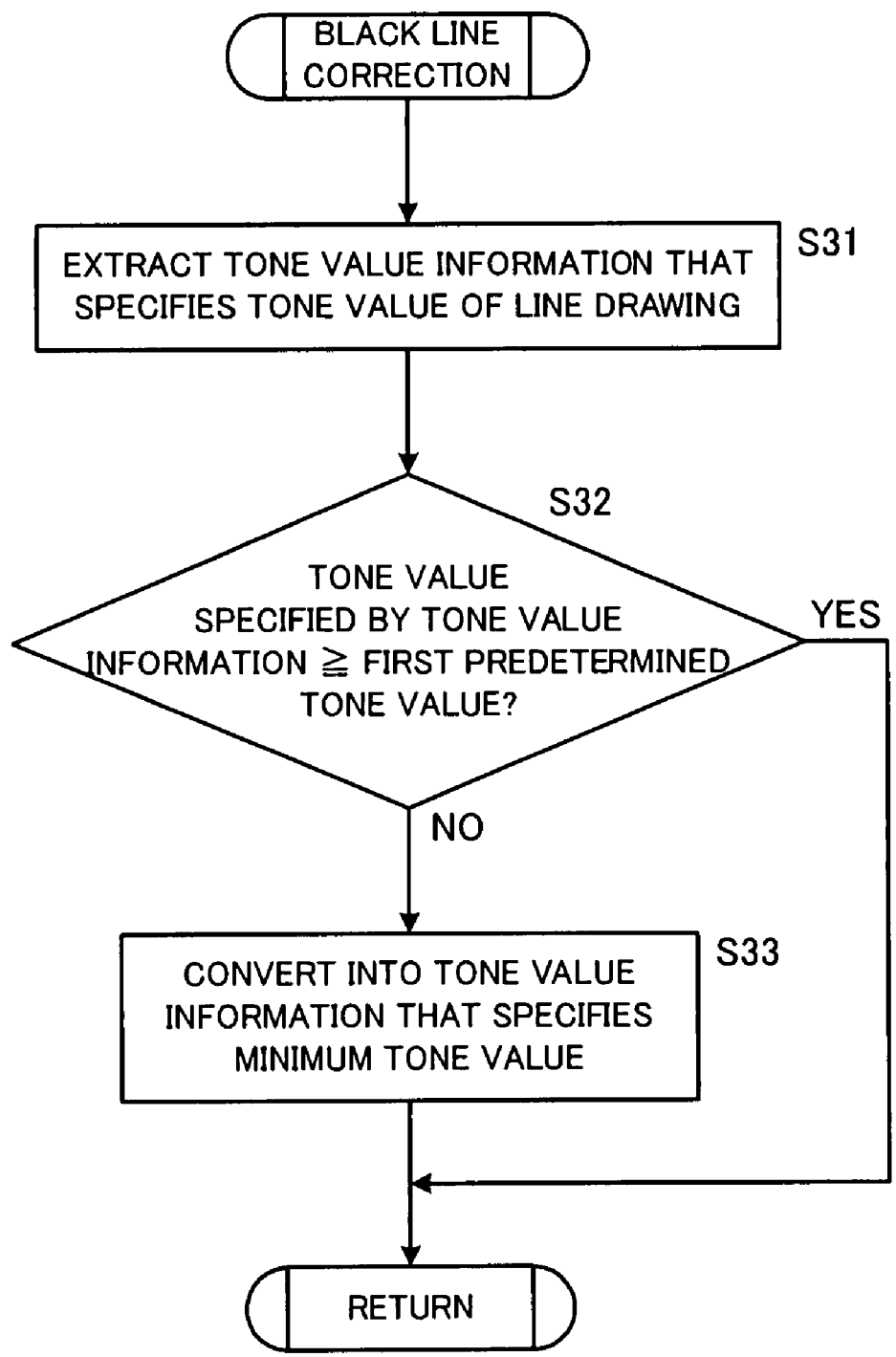
FIG. 3 illustrates a flow chart depicting the process sequence of the control unit for black line correction of image data.

FIG. 3 illustrates a flow chart depicting the process procedures of the control unit 11 for black line correction of image data. In the case in which the control unit 11 calls the sub-routine for black line correction of image data, it extracts tone value information that specifies the tone value of a line drawing to be drawn by the drawing instruction extracted at Step S13 (Step S31).

Then, the control unit 11 determines whether the tone value specified by the tone value information is equal to or greater than a first predetermined tone value, for example 255 when the tone value is expressed by eight bits (Step S32). When it is determined that the value is below the first predetermined tone value (Step S32: NO), the control unit 11 converts the tone value information extracted at Step S31 into a tone value information that specifies the minimum tone value, such as zero (Step S33). For example, when RGB values set in PC (Pen Color) of HPGL command are other than 0xFFFFFF (white), all values are converted into 0x000000 (black).

When the process step at Step S33 is ended, or when it is determined that the tone value specified by the tone value information at Step S32 is equal to or greater than the first predetermined value (Step S32: YES), the control unit 11 ends the process steps of the sub-routine for black line correction of image data.

As illustrated in FIG. 2, when the process step at Step S16 is ended, when it is determined that the image data correction is not required (Step S15: NO), or when it is determined that there is no drawing instruction to draw a line drawing at Step S14 (Step S14: NO), the control unit 11 determines whether the drawing instruction extracted at Step S13 is an instruction to end drawing (Step S17).

When it is determined that it is not an instruction to end drawing (Step S17: NO), the control unit 11 generates a drawing, that is, it generates image data based either on the drawing instruction extracted at Step S13 or on the drawing instruction corrected at Step S16 (Step S18), and returns the process step to Step S13. For example, based on the drawing instruction, a straight line is drawn over an image of bitmap data.

When it is determined that the drawing instruction is the instruction to end drawing (Step S17: YES), the control unit 11 gives the image data obtained by drawing to the printer unit 15 and makes it print the image (Step S19), and ends the process steps of the control unit 11 for image correction and printing.

FIGS. 4A and 4B illustrate schematic diagrams depicting images before and after image correction, respectively. FIG. 4A illustrates the image drawn based on image data before correction. The image comprises a bitmap data image 2 and a straight line drawing 3 drawn over the image 2. Here, the line drawing 3 comprises a black straight part 3a, and gray straight parts 3b and 3c configuring two edges of the straight part 3a.

FIG. 4B illustrates the image drawn based on image data after correction. The image comprises a bitmap data image 2 and a straight line drawing 4 drawn over the image 2. The line drawing 4 is obtained by converting the gray straight parts 3b and 3c before correction into black, which is more visible than the line drawing 3 drawn in FIG. 4A. In addition, since only the tone value information that specifies the tone values of the line drawings 3b and 3c drawn by the drawing instruction is converted, the bitmap data image 2 is not changed.

In the image processing method and the multifunction device 1 according to the embodiment 1, corrected image data can be obtained that corrects a line drawing drawn over an image to have better visibility, without degrading the image of bitmap data.

In addition, a user can select whether to require correction depending on the colors of the image given by the image data.

Furthermore, a line drawing drawn over an image can be printed to have good visibility without applying image processing to original image data.

Second Embodiment

Figure 5:
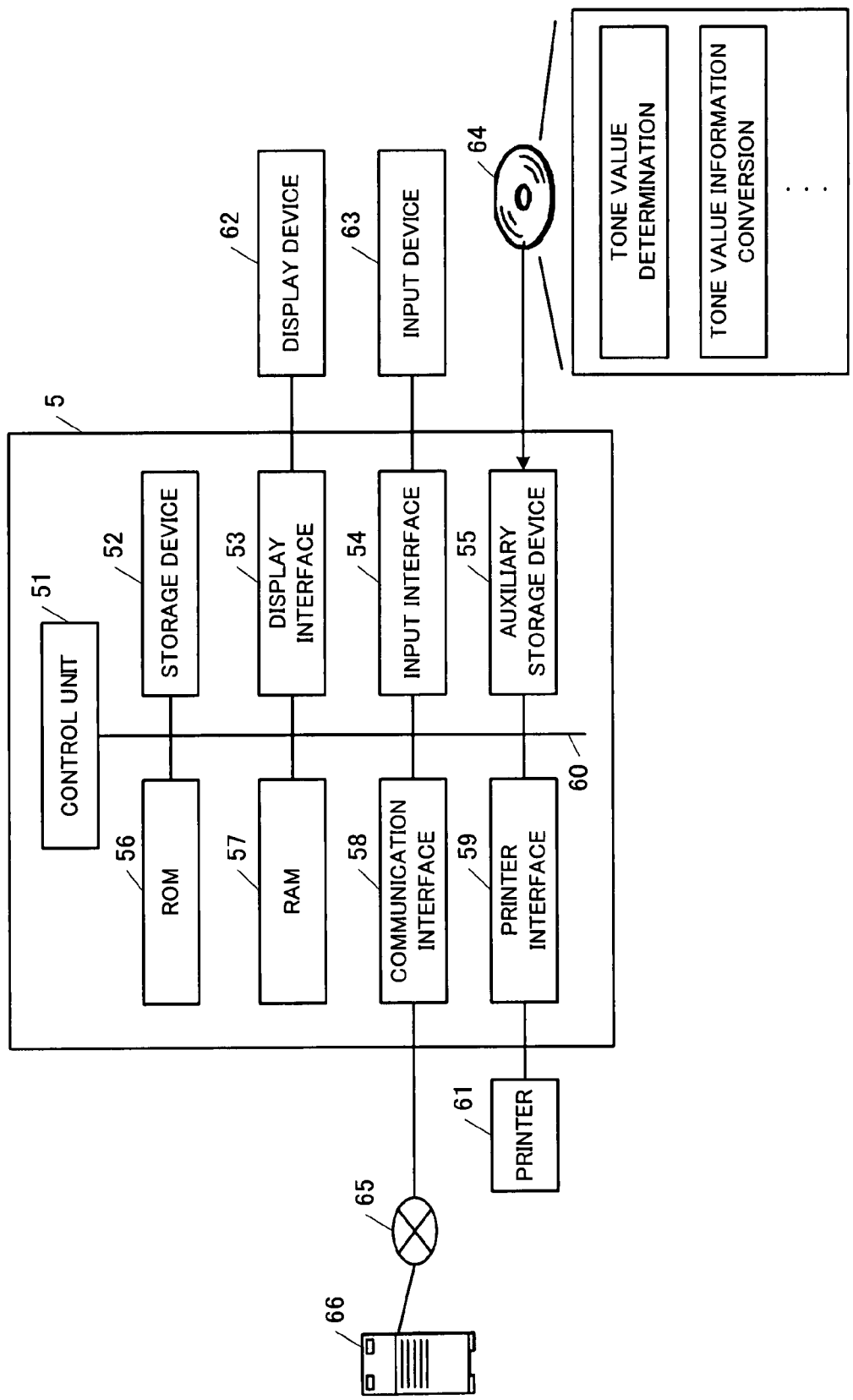
FIG. 5 illustrates a block diagram depicting a computer which performs an image processing method according to a second embodiment of the present invention, a computer program which allows the computer to perform the image processing method, and a recording medium on which the computer program is recorded.

FIG. 5 illustrates a block diagram depicting a computer 5 which performs an image processing method according to the second embodiment of the present invention, a computer program which allows the computer 5 to perform the image processing method, and a recording medium 64 on which the computer program is recorded.

In the drawing, the computer 5, which performs the image processing method according to the second embodiment of the present invention, has a control unit 51 formed of a CPU. To the control unit 51, a ROM 56, a RAM 57, a storage device 52 and a printer interface 59 are connected through a bus 60.

The ROM 56 comprises a flash memory, which stores control programs necessary for image data correction and printing by a printer 61. The storage device 52 is a hard disk which stores the computer programs according to the invention, and stores image data to be printed that was generated by drawing software such as DTP software.

To the printer interface 59, the printer 61 is connected through a cable. The control unit 51 transmits image data to the printer 61 through the printer interface 59, and allows the printer 61 to print an image on paper.

The printer 61 has the function that generates image data based on image data described in the page description language, and is configured to print an image based on the generated image data.

In addition, the computer 5 has an auxiliary storage device 55 which reads a computer program from a recording medium 64 such as a CD-ROM on which the computer program according to the embodiment 2 of the invention is recorded. The control unit 51 causes the auxiliary storage device 55 to store the computer program read out of the recording medium 64 in the storage device 52.

Furthermore, the computer 5 has a communication interface 58 which acquires the computer program according to the embodiment 2 of the invention from a server 66 via a network 65. The control unit 51 makes a request to the external server 66 for transmission of a computer program via the network 65, receives the computer program transmitted in response to the request, and stores the received computer program in the storage device 52.

Moreover, the computer 5 has a display interface 53 which supplies image data to a display device 62 such as a liquid crystal display or CRT, and an input interface 54 which detects the operational state of an input device 63 such as a keyboard or mouse.

Figure 6:
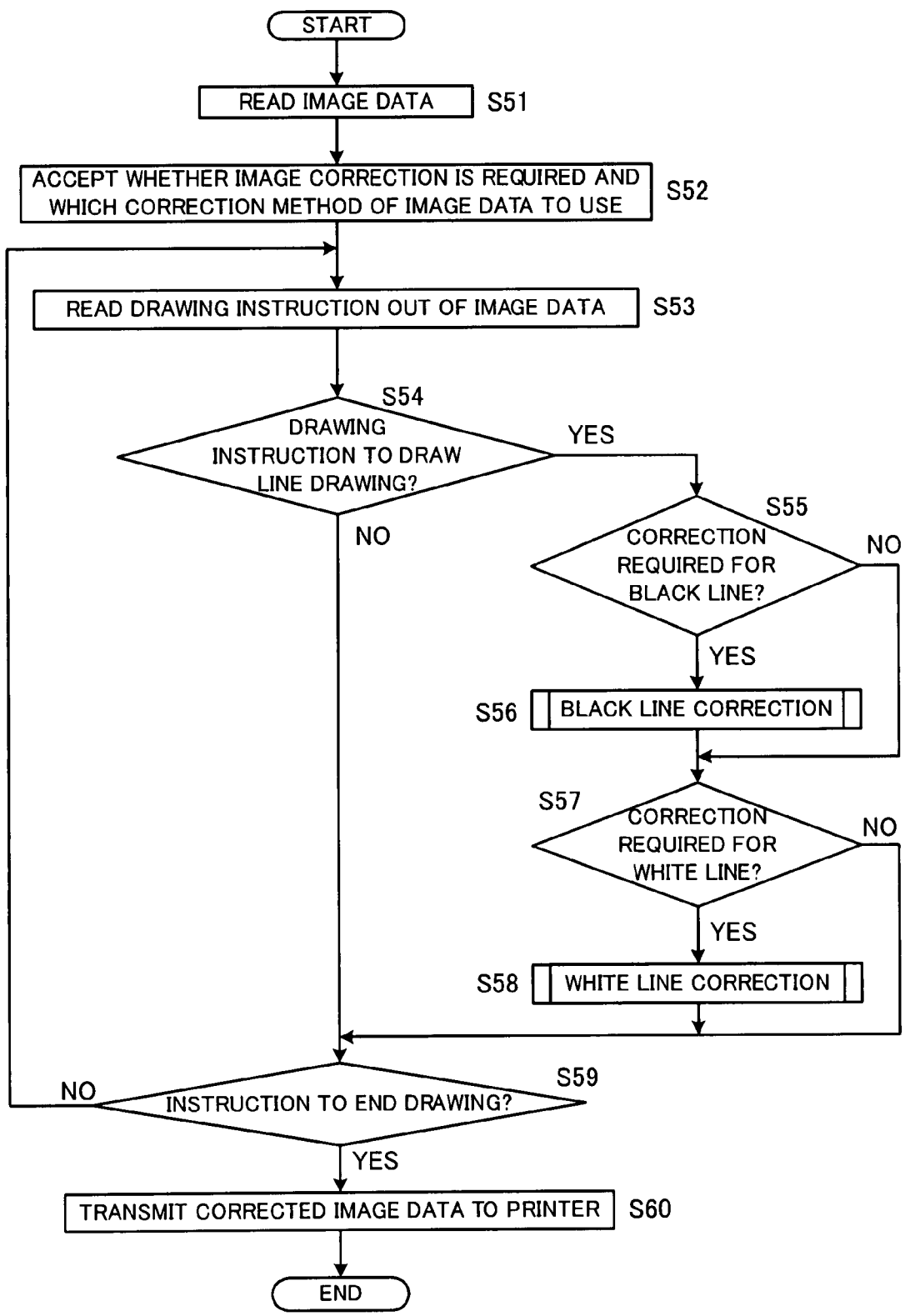
FIG. 6 illustrates a flow chart depicting the process sequence of the control unit for correction and printing image data.

FIG. 6 illustrates a flow chart depicting the process sequence of the control unit 51 for image data correction and printing. The control unit 51 reads image data out of the storage device 52 (Step S51). Then, the control unit 51 accepts whether to require image correction and the correction method for a white line or black line by detecting the operational state of the input device 63 connected to the input interface 54 (Step S52).

Subsequently, the control unit 51 reads one drawing instruction out of the image data (Step S53), and determines whether the read drawing instruction is a drawing instruction to draw a line drawing (Step S54).

If it is determined that it is a drawing instruction to draw a line drawing (Step S54: YES), the control unit 51 determines whether correction is required for a black line (Step S55). If it is determined that correction is required for a black line (Step S55: YES), the control unit 51 calls a sub-routine for black line correction, and corrects the image data (Step S56). The sub-routine for black line correction comprises the same process steps as those illustrated in FIG. 3.

When the process step at Step S56 is ended, or when it is determined that correction for a black line is not required (Step S55: NO), the control unit 51 determines whether correction is required for a white line (Step S57). If it is determined that correction is required for a white line (Step S57: YES), the control unit 51 calls a sub-routine for white line correction, and corrects the image data (Step S58).

Figure 7:
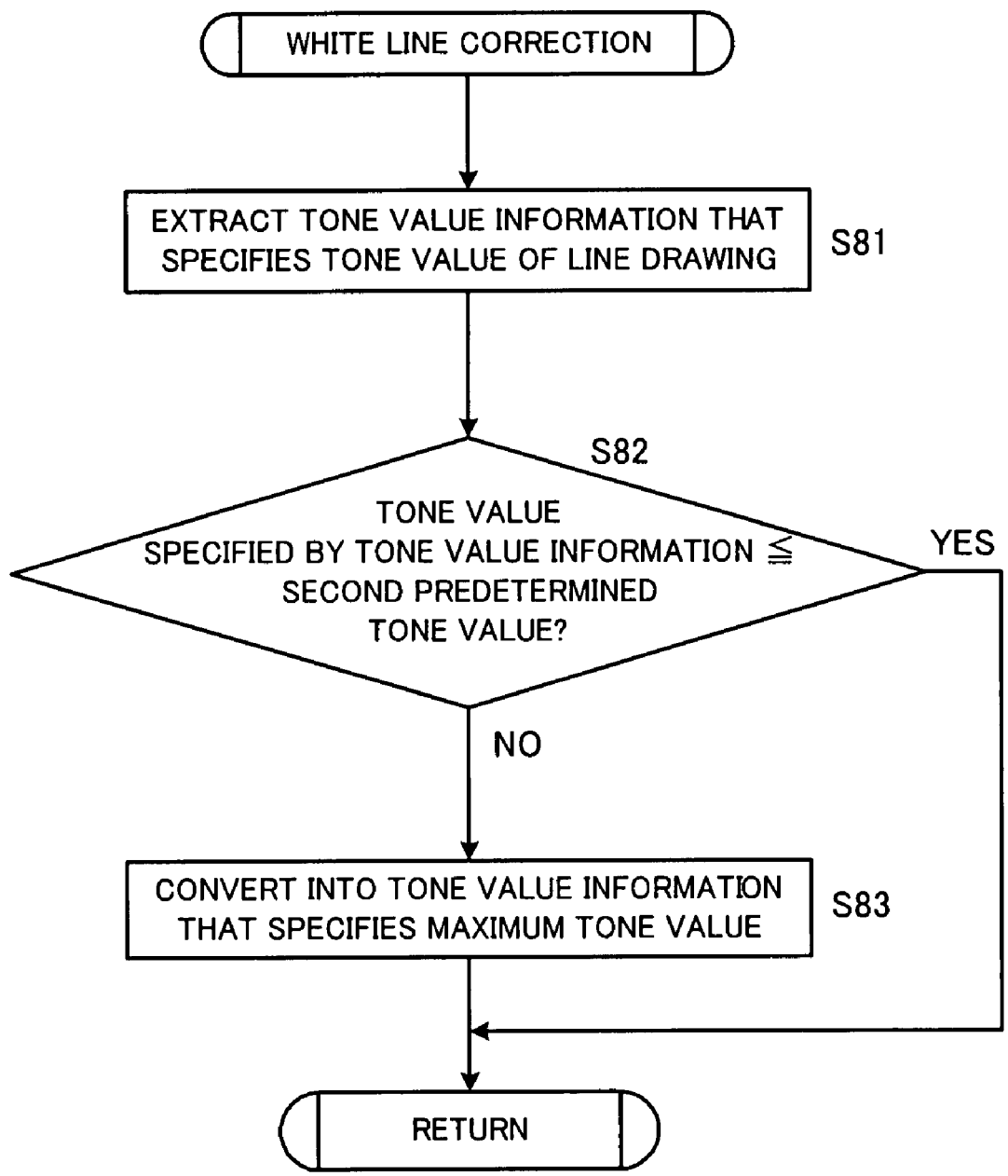
FIG. 7 illustrates a flow chart depicting the process sequence of the control unit for white line correction of image data.

FIG. 7 illustrates a flow chart depicting the process sequence of the control unit 51 for white line correction of image data. In the case in which the control unit 51 calls the sub-routine for white line correction of image data, it extracts tone value information that specifies the tone value of the line drawing drawn by the drawing instruction extracted at Step S53 (Step S81).

Then, the control unit 51 determines whether the tone value specified by the tone value information is equal to or smaller than a second predetermined tone value (Step S82). If it is determined that it is greater than the second predetermined tone value (Step S82: NO), the control unit 51 converts the tone value information extracted at Step S81 into a tone value information that specifies the maximum tone value, such as 255 (Step S83).

When Step S83 is completed, or when it is determined that the tone value specified by tone value information at Step S82 is equal to or smaller than the second predetermined tone value (Step S82: YES), the control unit 51 ends the process steps of the sub-routine for white line correction of image data.

As illustrated in FIG. 6, when Step S58 is ended, if it is determined that correction is not required for a white line (Step S57: NO), or when it is determined that the drawing instruction is not a drawing instruction to draw a line drawing (Step S54: NO), the control unit 51 determines whether the drawing instruction is an instruction to end drawing (Step S59). When it is determined that the drawing instruction is not an instruction to end drawing (Step S59: NO), the control unit 51 returns to Step S53.

If it is determined that the drawing instruction is the instruction to end drawing (Step S59: YES), the control unit 51 transmits the image data read at Step S51 or the image data that the image is corrected at Step S56 or Step S58 to the printer 61 through the printer interface 59 (Step S60), and ends the process steps of image data correction and printing.

According to the image processing method according to the embodiment 2, the computer 5, the computer program and the recording medium 64, a correction method can be selected depending on the colors of the image described by the bitmap data, and image data can be obtained that corrects a line drawing drawn over an image to have good visibility without degrading the image of bitmap data.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. An image processing method of correcting image data, the image data including bitmap data of an image, a drawing instruction and tone value information, the method comprising:
    reading the drawing instruction from the image data;
    determining whether the drawing instruction read from the image data is a drawing instruction to draw a line drawing over the image;
    extracting the tone value information from the image data in response to determining that the drawing instruction read from the image data is the drawing instruction to draw a line drawing over the image, wherein the tone value information specifies a tone value of the line drawing drawn in accordance with the drawing instruction;
    determining whether the tone value specified by the tone value information included in image data is equal to or greater than a predetermined tone value; and
    converting the tone value information into a description that specifies a tone value that is smaller than the tone value specified by the tone value information included in the image data if it is determined that the tone value specified by the tone value information included in the image data is not equal to or greater than the predetermined tone value.

2. The image processing method according to claim 1, wherein the predetermined tone value is 255; and
    the converting step converts the tone value information into a description that indicates a tone value of 0 if it is determined that the tone value is not equal to or greater than 255.

3. An image processing device which corrects image data, the image data including bitmap data of an image, a drawing instruction and tone value information, the image processing device comprising:
    reading means for reading the drawing instruction from the image data;
    first determining means for determining whether the drawing instruction read from the image data is a drawing instruction to draw a line drawing over the image;
    extracting means for extracting the tone value information from the image data in response to determining that the drawing instruction read from the image data is the drawing instruction to draw a line drawing over the image, wherein the tone value information specifies a tone value of the line drawing drawn in accordance with the drawing instruction;
    second determining means for determining whether the tone value specified by the tone value information included in image data is equal to or greater than a predetermined tone value; and
    converting means for converting the tone value information into a description that specifies a tone value that is smaller than the tone value specified by the tone value information included in the image data if the second determining means determines that the tone value specified by the tone value information included in the image data is not equal to or greater than the predetermined tone value.

4. The image processing device according to claim 3, wherein the predetermined tone value is 255; and
    the converting means converts the tone value information into a description that indicates a tone value of 0 if the second determining means determines that the tone value is not equal to or greater than 255.

5. An image processing device which corrects image data, the image data including bitmap data of an image, a drawing instruction and tone value information, the image processing device comprising:
    accepting means for accepting a correction method of image data;
    reading means for reading the drawing instruction from the image data;
    first determining means for determining whether the drawing instruction read from the image data is a drawing instruction to draw a line drawing over the image;
    extracting means for extracting the tone value information from the image data in response to determining that the drawing instruction read from the image data is the drawing instruction to draw a line drawing over the image, wherein the tone value information specifies a tone value of the line drawing drawn in accordance with the drawing instruction;
    second determining means for determining whether the tone value specified by tone value information is equal to or greater than a first predetermined tone value when the accepting means accepts a first correction method;
    first converting means for converting the tone value information into a description that specifies a still smaller tone value if the second determining means determines that the tone value is not equal to or greater than the first predetermined tone value;
    third determining means for determining whether the tone value specified by tone value information is equal to or smaller than a second predetermined tone value when the accepting means accepts a second correction method; and second converting means for converting the tone value information into a description that indicates a tone value that is greater than the tone value specified by the tone value information when the third determining means determines that the tone value specified by the tone value information is not equal to or smaller than the second predetermined tone value.

6. The image processing device according to claim 5, wherein the first predetermined tone value is 255;
the first converting means converts the tone value information into a description that indicates a tone value of 0 if the second determining means determines that the tone value is not equal to or greater than 255;
the second predetermined tone value is 0; and
the second converting means converts the tone value information into a description that indicates a tone value of 255 if the third determining means determines that the tone value is not equal to or smaller than 0.

7. A recording medium on which a computer program is recorded, the computer program being configured to cause a computer to carry out an image processing method of correcting image data, the image data including bitmap data of an image, a drawing instruction and tone value information, the method comprising:
reading the drawing instruction from the image data;
determining whether the drawing instruction read from the image data is a drawing instruction to draw a line drawing over the image;
extracting the tone value information from the image data in response to determining that the drawing instruction read from the image data is the drawing instruction to draw a line drawing over the image, wherein the tone value information specifies a tone value of the line drawing drawn in accordance with the drawing instruction;
determining whether the tone value specified by tone value information included in image data is equal to or greater than a predetermined tone value; and
converting the tone value information into a description that specifies a tone value that is smaller than the tone value specified by the tone value information included in the image data if it is determined that the tone value specified by the tone value information included in the image data is not equal to or greater than the predetermined tone value.

8. The recording medium according to claim 7, wherein the predetermined tone value is 255; and
the converting step converts the tone value information into a description that indicates a tone value of 0 if it is determined that the tone value is not equal to or greater than 255.

9. An image processing method of correcting image data, the image data including bitmap data of an image, a drawing instruction and tone value information, the method comprising:
reading the drawing instruction from the image data;
determining whether the drawing instruction read from the image data is a drawing instruction to draw a line drawing over the image;
extracting the tone value information from the image data in response to determining that the drawing instruction read from the image data is the drawing instruction to draw a line drawing over the image, wherein the tone value information specifies a tone value of the line drawing drawn in accordance with the drawing instruction;
determining whether the tone value specified by the tone value information included in image data is equal to or smaller than a predetermined tone value; and
converting the tone value information into a description that specifies a tone value that is greater than the tone value specified by the tone value information included in the image data if it is determined that the tone value specified by the tone value information included in the image data is not equal to or smaller than the predetermined tone value.

10. The image processing method according to claim 9, wherein the predetermined tone value is 0; and
the converting step converts the tone value information into a description that indicates a tone value of 255 if it is determined that the tone value is not equal to or smaller than 0.

11. An image processing device which corrects image data, the image data including bitmap data of an image, a drawing instruction and tone value information, the image processing device comprising:
reading means for reading the drawing instruction from the image data;
first determining means for determining whether the drawing instruction read from the image data is a drawing instruction to draw a line drawing over the image;
means for extracting the tone value information from the image data in response to determining that the drawing instruction read from the image data is the drawing instruction to draw a line drawing over the image, wherein the tone value information specifies a tone value of the line drawing drawn in accordance with the drawing instruction;
second determining means for determining whether the tone value specified by the tone value information included in image data is equal to or smaller than a predetermined tone value; and
converting means for converting the tone value information into a description that specifies a tone value that is greater than the tone value specified by the tone value information included in the image data if the second determining means determines that the tone value specified by the tone value information included in the image data is not equal to or smaller than the predetermined tone value.

12. The image processing device according to claim 11, wherein the predetermined to value is 0, and
the converting means converts the tone value information into a description that indicates a tone value of 255 if the second determining means determines that the tone value is not equal to or smaller than 0.

13. A recording medium on which a computer program is recorded, the computer program being configured to cause a computer to carry out an image processing method of correcting image data, the image data including bitmap data of an image, a drawing instruction and tone value information, the method comprising:
reading the drawing instruction from the image data;
determining whether the drawing instruction read from the image data is a drawing instruction to draw a line drawing over the image;
extracting the tone value information from the image data in response to determining that the drawing instruction read from the image data is the drawing instruction to draw a line drawing over the image, wherein the tone value information specifies a tone value of the line drawing drawn in accordance with the drawing instruction;

determining whether the tone value specified by tone value information included in image data is equal to or smaller than a predetermined tone value; and converting the tone value information into a description that specifies a tone value that is greater than the tone value specified by the tone value information included in the image data if it is determined that the tone value specified by the tone value information included in the image data is not equal to or smaller than the predetermined tone value.

14. The recording medium according to claim 13, wherein the predetermined value is 0; and the converting step converts the tone value information into a description that indicates a tone value of 255 if it is determined that the tone value is not equal to or smaller than 0.

* * * * *